Figure 1:
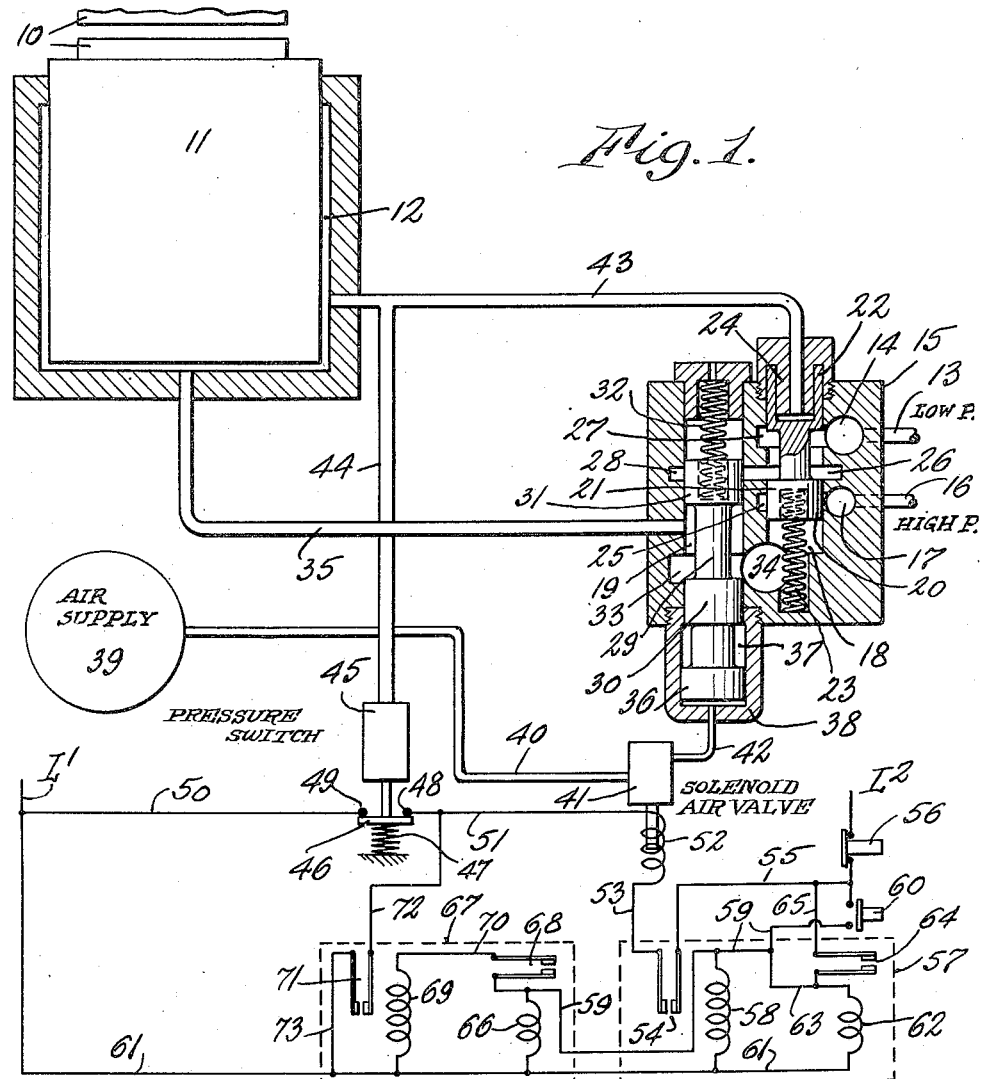

Jan. 16, 1945. T. F. STACY 2,367,242
MOLDING PRESS
Filed Sept. 30, 1939

INVENTOR
Thomas F. Stacy
BY
Parker, Brockman & Farmer
ATTORNEYS

Patented Jan. 16, 1945

2,367,242

UNITED STATES PATENT OFFICE 2,367,242

MOLDING PRESS

Thomas F. Stacy, Piqua, Ohio, assignor to The French Oil Mill Machinery Company, Piqua, Ohio Application September 30, 1939, Serial No. 297,335

13 Claims. (Cl. 18—16)

This invention relates to molding presses and particularly to those which are actuated hydraulically. In the operation of presses for certain molding materials such as rubber it is desirable to subject the material or rubber in the dies to a plurality of alternate, repeated pressures and releases of pressure in order to work out of the molding material air which has been entrapped therein, and this subjection of the material to such alternate, repeated pressures and releases of pressure is termed "bumping." The controls of the press by which the "bumping" is accomplished are usually of the manual type and the operator merely releases the hydraulic pressure in the ram cylinder, which in turn releases the pressure of the dies, and the entrapped air which is under pressure then escapes. Pressure is then again applied and the material further worked into the dies. This operation is often kept up for as many as twenty-five times. Attempts have been made to control this "bumping" automatically, but heretofore, so far as I am aware, the automatic control has been accomplished by using cut cams which operate small air valves, which in turn operate the hydraulic valves controlling the press. The cutting of the cams is a somewhat intricate operation, but it does control a definite number of "bumps." It does not control the "bumping" according to the pressure in the ram, but rather by time, and the amount that the press ram will drop between "bumps" depends upon the amount of time required.

An object of this invention is to provide an improved method and apparatus for automatically "bumping" molding material such as rubber in presses, which will be directly responsive to the pressure on the material and in the dies, and which will be relatively simple, rapid and inexpensive.

Another object of the invention is to provide an improved method of "bumping" the material in a press automatically to work the entrapped air out of the material, with which the "bumping" may be followed automatically by the subjection of the material to sustained pressure for a selected interval of time and then by a sustained release of pressure, in a simple manner and with relatively inexpensive apparatus.

Another object of the invention is to provide improved apparatus for operating a rubber press, with which the "bumping" of the rubber to eliminate entrapped air from the rubber may be accomplished automatically; with which the "bumping" will be automatically followed by a sustained pressure on the rubber of any desired amount for a predetermined period of time and then by a sustained release of pressure to enable opening of the dies; which will require a minimum of additional controlling apparatus; and which will be relatively simple, compact, dependable, efficient, rapid and inexpensive.

Other objects and advantages will be apparent from the following description of two embodiments of the invention, and the novel features will be particularly pointed out hereinafter in connection with the appended claims.

Figure 2:
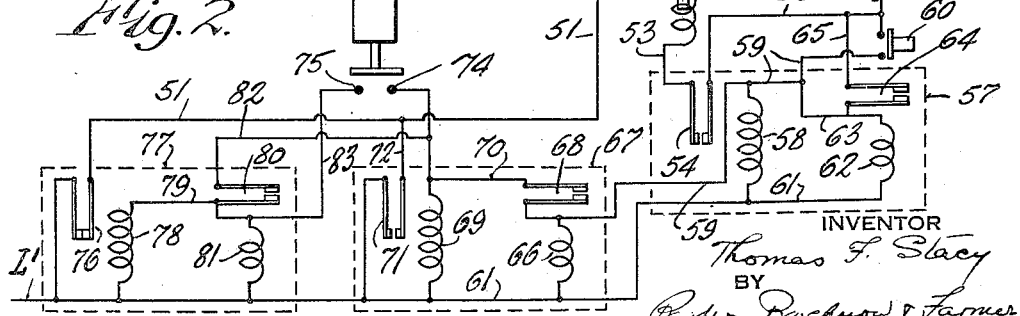

In the accompanying drawing:

Fig. 1 is a schematic diagram illustrating the application of this invention to a rubber press; and Fig. 2 is a schematic diagram of a portion of the press controls and illustrating a modification of the control of Fig. 1.

In the accompanying drawing, and referring particularly to Fig. 1, the rubber press may be of any suitable or desired construction having any suitable rubber dies 10, shown conventionally, one of which dies is carried by a ram 11 which reciprocates in a hydraulic cylinder 12. When operating fluid under pressure is admitted to the cylinder 12, the ram 11 will be operated to subject the rubber in the dies to hydraulic pressure, and when the pressure in the cylinder 12 is released, the ram 11 will descend and open the dies, which descent may be accomplished in any suitable manner as usual in hydraulically operated rubber presses, and may, if desired, include a continuous pressure on the ram to retract it when the pressure in the cylinder 12 is released.

In the particular embodiment which has been illustrated, a source of operating fluid under relatively low pressure is supplied through a pipe 13 to an inlet port or valve chamber 14 provided in a valve casing 15 of suitable valve means for controlling the activity of the ram 11. A source of operating fluid under a relatively high pressure is supplied through a pipe 16 to a high pressure valve chamber 17 in the valve casing 15. The valve casing 15 is provided with two longitudinally extending chambers 18 and 19, both of which are, for convenience, located side by side and parallel to one another. In the chamber 18 a spool shaped valve element 20 with lands 21 and 22 is mounted for reciprocation endwise of the chamber 18 and is urged upwardly in one direction by a helical spring 23 reacting between the land 21 and the lower end of the chamber 18. The land 22 is recessed at its outer end so as to telescope over a stem 24 which acts as a stationary piston or ram.

The land 21, when disposed in its upper position to which it is forced by the spring 23, covers and closes a port 25 in the side wall of the valve 18, which port communicates with the high pressure chamber 17. When the valve element is operated endwise against the action of spring 23 from the position shown in full lines in Fig. 1, it uncovers the port 25 and places it in communication with another port 26 which is disposed in the side wall of the chamber 18, intermediate of the ends of the latter. The land 22, when the valve element 20 is in the position shown in full lines in Fig. 1, uncovers a port 27 in the side wall of the chamber 18 which communicates with the low pressure chamber 14 of the valve casing. Thus when the valve element 20 is in the position shown in full lines in Fig. 1, the port 27 leading from the low pressure chamber 14 will be in communication through a central zone of the chamber 18 with the port 26, and the port 25 will be closed off. When the valve element 20 is shifted endwise against the action of spring 23, the land 22 will cover and close the port 27 and interrupt communication between the chamber 14 and the port 26, and the land 21 will uncover the port 25 and place it in communication with the port 26.

The chamber 19 is provided intermediate of its ends with a port 28 which communicates with the port 26. In the chamber 19 a valve element 29 is mounted for endwise reciprocation, and this valve element is spool shaped with a land 30 at its lower end and a land 31 at its upper end. A spring 32 acts between the upper end wall of the chamber 19 and the land 31 to urge the valve element downwardly in Fig. 1, until the land 31 closes the port 28 and the land 30 uncovers an exhaust port 33 also provided in the side wall of the chamber 19. The exhaust port 33 communicates with an exhaust chamber 34 in the valve casing 15, which chamber in turn is connected by a suitable pipe, not shown, to exhaust. Since lubricating oil is commonly used as the operating fluid in hydraulic rams, the exhaust pipe from the chamber 34 will then be connected back to the reservoir as usual in hydraulic press systems.

A pipe or conduit 35 leads from the bottom or inner end of the cylinder 12 to the chamber 19 between the ports 28 and 33, and when the valve element 29 is in the position shown in full lines in Fig. 1, which is the position into which it is urged by the sprng 32, the port 28 will be closed and the port 33 will connect the pipe 35 with the exhaust port 33, thus releasing pressure from the ram cylinder 12. Suitable means is provided for forcing the valve element 29 against the action of the spring 32, which will be upwardly in Fig. 1, until the land 31 uncovers the port 28 and connects it, through the space of the chamber 19 between the lands, to the inlet to the pipe 35 at which time the land 30 will cover and close the exhaust port 33.

As suitable and preferred actuating means for this purpose I provide a small hydraulic pilot piston 36 which reciprocates in a pilot cylinder 37 provided in a cup-like removable extension 38 of the lower end of the valve casing 15. The piston 36 bears against the land 30 so as to limit the downward movement of the valve element 29 under the action of spring 32, and serves to force the valve element upwardly against and compress spring 32, when an operating fluid under pressure is supplied to the closed end of the pilot chamber 37 beneath the piston 36. For this purpose I have shown a source 39 of compressed air connected through a pipe 40 to a solenoid operated air valve 41. The latter is connected by a pipe 42 to the pilot cylinder 37. The air valve 41 serves to connect the source of compressed air 39 with the cylinder 37 and cause a forward movement of piston 36, or to disconnect it therefrom and simultaneously vent the pipe 42 so as to permit descent of the piston 36 under the action of spring 32.

A pipe 43 is also connected to the cylinder 12 for the press ram 11, and to the end of the chamber 18 of the valve casing 15 so as to open through the inner end of the stem 24. Thus the hydraulic actuating pressure in the ram cylinder 12 will be communicated directly through the pipe 43 to the interior of the land 22, and since the latter then acts as the movable element of a small hydraulic ram, any pressure in the cylinder 12 will tend to force the valve element 20 downwardly against the action of spring 23 and close the low pressure port 27 from the port 26 and open communication between the port 26 and the high pressure port 25.

The pipe 43 is also connected by a branch pipe 44 to a suitable pressure switch 45 of the type which is normally closed, but which when opened by pressure therein will preferably remain open until the pressure has fallen to a desired extent, such as to zero. Such pressure switches are available in the open market, and since the details of the same per se form no part of the present invention they have been illustrated only diagrammatically. The switch 45, when the pressure thereon builds up to a predetermined extent, forces a conducting bar or bridge 46 against the action of spring 47 out of bridging engagement with contacts 48 and 49. Line wires $L^1$ and $L^2$ supply current for the solenoid operated air valve 41. A wire 50 leads from the line wire $L^1$ to the contact 49, and another wire 51 connects the contact 48 of the pressure switch to the winding 52 of the solenoid operated air valve 41.

The winding 52 is also connected by a wire 53 to one side of a normally open, timer switch 54, the other side of that switch being connected by a wire 55 to one side of a normally closed, manually operated switch 56, the other side of the switch being connected to line wire $L^2$. The normally open timer switch 54 forms a part of the timer 57 of any suitable make, such timers being available in the open market. For example, in such timers the normally open switch 54 may be closed at the start of the operation of the timer and remain closed for a predetermined period of time for which the timer is set, at the end of which time the switch 54 will be automatically opened and the operation of the timer stopped.

The timer winding or coil 58 represents diagrammatically the usual timer coil or mechanism by which the timer is operated, and one side of this winding 58 is connected by a wire 59 to one side of a normally open starting switch 60, the other side of which is connected to the wire 55 through switch 56 to the line wire $L^2$. The other side of the timer coil 58 is connected to a common return wire 61 leading to the line wire $L^1$. Also in the timer 57 is a holding coil 62 which is connected at one side by a wire 63 to the wire 59, and also through a normally open switch 64 and wire 65 to the wire 55. The normally open switch 64 is in a position to be closed magnetically by the energization of the holding coil 62. The other side of the coil 62 is connected to the common wire 61 leading to the line wire L¹. The wire 59 also extends to a holding coid 66 provided in a second timer 67 which is similar in some respects to the timer 57, the other side of the holding coil 66 being connected to the common wire 61 leading to the line wire L¹.

A normally open switch 68 which is magnetically closed by the energization of the holding coil 66 connects the wire 59 to a timer coil 69 through a wire 70, the timer coil 69 of the timer 67 being similar to the timer coil 58 and also connected to the common wire 61. The timer coil 69, when energized in a manner common in timers, operates to close a normally open switch 71 at the end of a predetermined period of time. One side of the switch 71 is connected by a wire 72 to the wire 51 and the other side of that switch is connected by a wire 73 to the common wire 61.

In the operation of the apparatus shown in Fig. 1, with the ram 11 in a retracted position and with rubber in the dies 10, a pressing operation is started by merely closing switch 60 which completes a circuit from line wire L² through switch 56 and wire 55 to wire 59 where it divides, one part going through timer winding 58 to common wire 61, thence to line wire L¹, the other part from wire 59 going through wire 63 and holding coil 62 to common wire 61 and thence back to line wire L¹. When holding coil 62 is energized, it closes, by magnetic attraction, the switch 64 which completes a holding circuit from the wire 55 past the switch 60 through wire 65, switch 64 and wire 63 to wire 59, thus shunting the switch 60. The holding coil 62 thus maintains a closed circuit through the winding 58 even though the switch 60 is immediately opened after being closed. The timer winding 58, as usual in this type of timer, immediately closes the switch 54 and holds it closed until the timer times itself out after the lapse of a predetermined period of time, and then it opens the circuit 54 and holds it open. At the end of this timing operation it also opens its own holding circuit such as by forcibly opening switch 64 which stops this timer.

At the same time that the timer 57 is rendered effective by the closing of switch 60, current also passes through wire 59 to the holding coil 66 of the second timer 67 and thence through common wire 61 to line wire L¹. The holding coil 66, when energized, closes the switch 68 and completes another branch circuit from wire 59 through the timer winding 69 of the timer 67. The timer winding 69 when energized in this manner operates to close the normally open switch 71 at the end of a predetermined lapse of time, which time is of course less than the time for which the timer 57 is set. At the end of the period of time for which the timer 67 is set, the switch 71 will be closed which completes a shunt circuit from the wire 51 through wire 72, switch 71 and wire 73, across the contacts 48 and 49 of the pressure switch 45. The closing of this circuit through the switch 71, shunts the pressure switch 45 and renders it ineffective. Switch 71 will remain closed until timer 57 times out.

When the timer winding 58 of timer 57 closed the switch 54, it completed another branch circuit from line wire L² through switch 56, wire 55, switch 54, wire 53, winding 52 of the solenoid operated air valve 41, wire 51, contacts 48 and 49 and bridge 46 of the pressure switch 45, and wire 50 to line wire L¹. When this circuit through the winding 52 of the solenoid operated air valve is closed, it causes an operation of the valve 41 to close the vent to pipe 42 and to connect the source of compressed air 39 through pipe 40 to the pipe 42, whereupon compressed air acts on the piston 36 to shift the valve element 29 from the full line position in Fig. 1 upwardly until the land 30 closes the exhaust port 33 and uncovers the inlet port 28. At this time the pipe 35 is connected through the space between the lands 30 and 31 to the port 28, thence to the port 26, and since at that time the valve element 20 is in the full line position of Fig. 1, the low pressure source of operating fluid will pass through the supply pipe 13, chamber 14, port 27, thence through the space between the lands 21 and 22 to the port 26, thence to the port 28, pipe 35 and the cylinder 12.

The low pressure tends to operate the ram 11 in a manner to compress the rubber in the dies until it encounters a definite resistance, whereupon the back pressure in the cylinder 12 builds up and is communicated through the pipe 43 to the chamber within the land 22. Before this back pressure equals that of the pressure on the actuating fluid from the low pressure supply, it is sufficient to overcome the spring 23 and force the valve element 20 downwardly in Fig. 1, until the land 22 covers the port 27 and shuts off the low pressure supply chamber 14 from the port 26, and uncovers the port 25 that connects the high pressure source from chamber 17 through ports 25, 26 and 28 to the pipe 35, so that the operating fluid under the high pressure then passes to the ram 11 and continues the compression. When the pressure in the ram cylinder 12 increases still more and reaches a predetermined pressure, it overcomes the pressure of spring 47 on the pressure responsive switch and opens the circuit to the winding 52 of the solenoid operated air valve, by separating the bridge 46 from contacts 48 and 49.

When the circuit through the winding 52 is opened in this manner, the air valve is immediately operated by spring pressure in the usual manner to cut off the air supply from the pipe 40 and vent the pipe 42, whereupon the pressure on the piston 36 falls off and the spring 32 returns the valve element 29 to the full line position of Fig. 1, at which time the land 31 covers the port 28 and shuts off the supply of operating fluid under pressure to the pipe 35, and connects the pipe 35 through the exhaust port 33 to the exhaust chamber 34. The pressure in cylinder 12 thereupon falls rapidly and after it has fallen to a predetermined extent, the pressure switch 45 will again close the circuit at the contacts 48 and 49. This again energizes the solenoid of the air valve 41 and starts a new cycle of pressure increase and release on the ram 11 and through it on the rubber in the dies 10. This alternate building up of pressure and release is continued repeatedly until the timer 67 times out after the lapse of a predetermined period of time for which it is adjustably set, whereupon that timer closes the switch 71 and shunts the pressure responsive switch 45.

Thereafter the circuit through the solenoid operated air valve 41 will not be opened upon the building up of pressure, but the pressure will continue in a sustained condition for a further period of time until the timer 57 times out and the circuit of the winding 52 is opened at the switch 54, whereupon the decrease in pressure in the ram cylinder 12 will be sustained and the ram 11 will be retracted and remain retracted until a new cycle of operation is started by again closing the switch 60. When timer 57 times out it also opens switch 64 and timer 57 is then dead. Opening switch 64 also opens circuit to timer 67. Switches 68 and 71 then open and remain open until next cycle is started by push button 60. It will be understood that the operation of the press may be stopped at any time during this cycle of movements by merely opening the switch 56. The timers 57 and 67, as explained above, may be of any suitable arrangement and many of them are available in the open market, but by way of example adjustable timers which may be used and which are available on the open market are known as the "Vernier-set" timers of the series 2800 type which are marketed by the Automatic Temperature Control Company, 34 East Logan Street, Philadelphia, Pennsylvania. Other concerns manufacture timers which are equally suitable for this purpose, but since the details of such timers are not per se a part of this invention, such timers have been shown only diagrammatically and their function in this invention explained.

Referring now to the modification of the invention shown in Fig. 2, the construction is the same as in Fig. 1 except that the pressure switch 45a which corresponds to the switch 45 of Fig. 1 is of the type which is normally open but operable, whenever the pressure thereon from the ram cylinder 12 reaches a predetermined pressure, to close a circuit across the contacts 74 and 75. In this form of the invention the timers 57 and 67 are the same as the timers 57 and 67 of Fig. 1 and other parts in Fig. 2 which correspond to parts in Fig. 1 are designated by the same reference numerals. The switch 71 of timer 67, instead of being connected across the pressure responsive switch as in Fig. 1, is connected at one side by its wire 72 to the wire 51 leading from the winding 52 of the solenoid operated air valve 41. This wire 51 instead of being connected to the pressure responsive switch as in Fig. 1, is connected to one side of a switch 76 of another timer 77. The other side of switch 76 is connected to common wire 61. The switch 76 is normally closed at the start of timer 77 but is opened and held open until the end of the timing interval for which that timer 77 is set, and then is again closed.

The timer coil 78 of the timer 77 is also connected at one side to the common wire 61 leading to the line wire L¹, and at its other side is connected by wire 79 to one side of a switch 80 which is closed by the energization of the holding coil 81 and held closed. The other side of the switch 80 is connected by a wire 82 to the wire 70, and also to contact 74 of the pressure responsive switch 45a. The contact 75 of switch 45a is connected by a wire 83 to one end of the holding coil 81 and to the wire 79 which is connected to the switch 80. The other end of the holding coil 81 is connected to the common wire 61.

The operation of the system shown in Fig. 2 is similar to that explained for Fig. 1 in so far as the ram is controlled from the solenoid operated air valve. To start a pressing operation the switch 60 is operated as before, which starts the timers 57 and 67 the same as in Fig. 1. The switch 76 is normally closed when the timer 77 is idle, but is opened by the starting of the timer 77 and held open until this timer times out or has operated for the predetermined interval of time, whereupon switch 76 again closes and remains closed while the timer 77 is idle. The switch 76 is therefore closed at the time the starting switch 60 was operated to start the pressing operation. The closing of the switch 54 in the timer 57 completes a circuit through the winding 52 of the solenoid operated air valve, the wire 51 from the winding 52 being connected to the common wire 61 through the switch 76 of the third timer 77.

The ram 11 is then actuated and when the pressure on the rubber builds up to a predetermined pressure, the pressure responsive switch 45a will be operated to complete a circuit between contacts 74 and 75. Since the switch 68 of the timer 67 was closed immediately upon the starting of the pressing operation, a new circuit will now be established through the pressure responsive switch and contacts 74 and 75 thereof, to the timer 77 to energize the holding coil 81. The latter then closes the switch 80 which completes a shunt circuit from the wire 70 to the holding coil 81 and the timer coil 78, thus shunting the pressure responsive switch 45a. The timer 77 then starts to operate and immediately opens its switch 76 and holds it open until this third timer 77 has timed out. Upon the opening of switch 76, the circuit of the solenoid operated air valve winding 52 will be opened, whereupon the air valve will cause a release of pressure on the ram 11. The pressure release will remain effective during the time for which the timer 77 is set, whereupon the switch 76 is again automatically closed.

The reclosing of switch 76 then again completes a circuit through winding 52 of the solenoid operated air valve, and hence causes a new delivery of operating fluid under pressure to the ram 11 to subject the rubber to another pressure cycle. When the pressure builds up again to the desired extent the switch 45a will connect contacts 74 and 75 and again start the timer 77 for a new operation. The cycle is then repeated and the ram will be subjected to pressure and release of pressure repeatedly in such cycles until the timer 67 times out, at which time the switch 71 will be closed. The closing of switch 71 then connects the wire 51 directly to the wire 61 and the timer 77 will be rendered ineffective. The solenoid operated air valve is thus removed from the control of the third timer 77, and the pressure on the ram 11 will be sustained until the timer 57 times out and, by opening of the holding switch 64, interrupts the circuit of the winding 52 of the air valve, whereupon the pressure on the ram 11 is released and the parts return to their normal idle position. The pressing operation may of course be terminated at any time by merely pressing the switch 56, the same as explained for Fig. 1.

With this arrangement we therefore have "bumping" operations of definite durations for a predetermined period of time. Thereafter the pressure is automatically sustained for another period of time, and then the pressure is released and the release sustained. This has an advantage that the press could be allowed to open a slight amount at each operation and thus allow a more complete release of the entrapped air from the rubber in the dies.

This mechanism for automatically controlling the "bumping" is very flexible, because the timers can be set or adjusted for any required times or periods by merely setting the timer dials as required. The pipes 43 and 44 are preferably connected directly to the cylinder 12, instead of being connected to the pipe 35, so that the pressures which operate the controls will be more directly and immediately responsive to the pressures on the rubber in the dies. The pressure in the pipe 35 leading to the ram cylinder might be somewhat higher than that in the cylinder 12 itself, due to possible pressure drop in the pipe and in the entrance to the cylinder.

While the invention has been described in considerable detail in connection with the "bumping" of rubber in a rubber molding press, it is applicable also to the molding of other materials in a press where it is desired to work entrapped air out of the molding material before final pressing.

It will be understood that various changes in the details and arrangements of parts, which have been herein described and illustrated in order to explain the nature of the invention, may be made by those skilled in the art within the principle and scope of the invention, as expressed in the appended claims.

I claim as my invention:

1. In a molding press in which the molding material in the dies is subjected to compression and release of pressure by the actuation of a hydraulic ram in opposite directions, the improved apparatus for actuating said ram to compress and somewhat release said material in the dies a number of times to work the entrapped air out of the material before final pressing which comprises said ram, valve means connected to said ram and having a controlling member operable into one position to cause delivery to said ram of an actuating fluid under pressure and operable into another position for releasing fluid from said ram, electrically controlled means for operating said member into said one position, means for operating said member into said another position, means directly controlled by the hydraulic pressure on said ram for causing, until removed from said control, repeated operations of said electrically controlled means into said another position whenever the pressure on said ram exceeds a predetermined pressure and into said one position whenever said pressure on said ram falls to a desired extent, whereby said ram will be subjected to repeated pressures and releases of pressure automatically, timing means operable to remove said electrically controlled means from control of said pressure responsive means and cause operation of said member into said one position, after the lapse of a predetermined period of time, and timing means operable to cause an actuation of said member into said another position automatically a predetermined interval of time after operation of said prior timing means to cause operation of said member into said one position.

2. In a molding press in which the molding material in the dies is subjected to compression and release of pressure by alternately delivering hydraulic operating fluid under pressure to a hydraulic ram and releasing said pressure, the improved apparatus for actuating said ram for this purpose a number of times to work the entrapped air out of the material before final pressing, which comprises said ram, valve controlled means for delivering operating fluid under pressure to the ram in a manner to actuate the ram and to compress the material and also for releasing the pressure on said ram, means directly controlled by the pressure on said ram for controlling said valve means to cause delivery of hydraulic operating fluid to the ram or release it therefrom and operable when the pressure on the ram exceeds a predetermined pressure for causing a release of pressure on the ram and for again delivering hydraulic fluid under pressure to the ram after the pressure on the ram has fallen to a desired extent, means for also controlling said valve controlled means and operable to start the operation of the ram initially to subject the material to pressure, timing means rendered effective by said starting means for removing said valve controlled means from the control of the pressure responsive means after the lapse of a predetermined period of time and maintaining said valve means in condition to deliver operating fluid under pressure continuously to said ram, and timing means also rendered effective by said starting means for also controlling said valve means and causing an operation thereof to relieve, and continue relieved, the pressure on said ram after the lapse of a predetermined interval of time after said starting operation.

3. In a molding press in which the molding material in the dies is subjected to compression and release of pressure by movements of a hydraulic ram to which operating fluid under pressure is delivered and from which it is released alternately a number of times to work the entrapped air out of the material before final pressing, improved press operating apparatus which comprises said ram, valve means controlling the delivery of actuating fluid to said ram and having a controlling member shiftable into one position in which it delivers operating fluid to said ram to compress the material and into another position in which it releases the fluid pressure on said ram, a solenoid operated air valve, a source of compressed air connected through said air valve to said valve means and operable on said member to force the latter into said one position and to release said member for movement into said other position, means urging said member into said other position, a circuit for the solenoid of said air valve including a starting switch, a switch continuously and yieldingly urged into closed position, but opened by fluid pressure, included in series in said circuit and directly responsive to the fluid pressure on said ram and opened by pressure in excess of a selected pressure, said circuit when closed operating said air valve to deliver compressed air to said valve means and operate said valve member into said one position and cause a building up of pressure on said ram, whereby when said pressure builds up to a predetermined extent it will operate said pressure switch and open the circuit of said air valve and cause an operation of said member into said other position where it releases pressure on said ram, and a predetermined fall of pressure on said ram causes the pressure switch to close said circuit and cause a re-application of pressure to said ram, repeatedly, and a timer having a normally open switch shunted across said pressure switch and operable when closed to incapacitate said pressure switch by shunting the same after the lapse of a predetermined interval of time, whereby said solenoid air valve will then remain energized and maintain continued pressure on said ram after the lapse of said interval of time.

4. In a molding press in which the molding material in the dies is subjected to compression and release of pressure by movements of a hydraulic ram to which operating fluid under pressure is delivered and from which it is released alternately a number of times to work the entrapped air out of the material before final pressing, which comprises said ram, valve means controlling the delivery of actuating fluid to said ram and having a controlling member shiftable into one position in which it delivers operating fluid to said ram to compress the material and into another position in which it releases the fluid pressure on said arm, a solenoid operated air valve, a source of compressed air connected through said air valve to said valve means and operable on said member to force the latter into said one position and to release said member for movement into said other position, means urging said member into said other position, a circuit for the solenoid of said air valve including a starting switch, a normally closed pressure switch included in series in said circuit and connected to said ram so as to be directly responsive to the fluid pressure on said ram, said circuit when closed operating said air valve to deliver compressed air to said valve means and operate said valve member into said one position and cause a building up of pressure on said ram, whereby when said pressure builds up to a predetermined extent it will operate said pressure switch and open the circuit of said air valve and cause an operation of said member into said other position where it releases pressure on said ram, and a predetermined fall of pressure on said ram causes the pressure switch to close said circuit and cause a re-application of pressure to said ram, repeatedly, a timer having a normally open switch shunted across said pressure switch and operable when closed to incapacitate said pressure switch by shunting the same after the lapse of a predetermined interval of time, whereby said solenoid air valve will then remain energized and maintain continued pressure on said ram after the lapse of said interval of time, and another timer having a normally closed switch in series with said solenoid air valve and operable to open said circuit after the lapse of a predetermined interval of time so as to render said solenoid air valve ineffective and thus cause and continue a full release of pressure on said ram.

5. In a molding press in which the molding material in the dies is subjected to repeated compressions and release of pressure by the application of operating fluid to the ram-carrying part of the dies and the release of fluid therefrom a number of times to work the entrapped air out of the material before final pressing, improved press operating apparatus which comprises said ram, electromagnetic means selectively operable to cause the admission of operating fluid to said ram or to release it therefrom, depending upon whether said electromagnetic means is energized or deenergized, means directly responsive to the pressure on said ram and controlling said electromagnetic means for causing an operation thereof to relieve said ram of pressure whenever the pressure on said ram has built up to a predetermined pressure, and for reestablishing the pressure on the ram after the pressure thereon has fallen to a desired extent, timing means effective after the lapse of a predetermined interval of time to incapacitate said pressure responsive means and render said electromagnetic means effective to cause a continuous application of pressure to said ram, and additional timing means also controlling said electromagnetic means, and operable after the starting of said first timing means and to cause an operation of said electromagnetic means in a manner to release, and continue released, the pressure on said ram a predetermined interval of time after said first timing means has started.

6. In a molding press in which the molding material in the dies is subjected to alternate compression and release of pressure by alternately delivering hydraulic operating fluid under pressure to a hydraulic ram operating the dies and releasing said pressure, the improved apparatus for actuating said ram for this purpose a number of times to work the entrapped air out of the material before final pressing, which comprises said ram, electromagnetic means selectively operable to cause the admission of operating fluid under pressure to said ram or to release it therefrom, depending upon whether said electromagnetic means is energized or de-energized, timing means controlling said electromagnetic means and operable to cause said electromagnetic means to release pressure from said ram for a selected interval of time, means directly responsive to the hydraulic pressure on said ram for starting said timer whenever the pressure on the ram exceeds a predetermined pressure, whereby pressure on said ram will be released when pressure thereon exceeds a predetermined pressure and will remain released a predetermined interval of time and then be automatically reapplied to said ram, another timer operable to remove the control of said electromagnetic means from said first timer and pressure responsive means after the lapse of a predetermined interval of time and operable through said electromagnetic means to cause sustained application of hydraulic pressure to said ram, and another timing means for also controlling said electromagnetic means and operable through said electromagnetic means to cause a release of pressure on said ram after the lapse of a predetermined interval of time and then maintain said release.

7. In a press in which the material in the dies is subjected to alternate compression and release of pressure by alternately delivering hydraulic operating fluid under pressure to a hydraulic ram operating the dies and releasing said pressure, the improved apparatus for actuating said ram for this purpose, which comprises said ram, electromagnetic means selectively operable to cause the admission of operating fluid to said ram or to release it therefrom, a pressure responsive switch actuated by the fluid pressure on said ram, a plurality of timing devices, circuit means including said timing devices and said switch for controlling said electromagnetic means and operable automatically to cause first a closing of the dies until a selected pressure is reached and then alternate opening and closing of said dies repeatedly a plurality of times for a selected interval of time and then a closing of the dies with a sustained pressure on the dies for a selected time interval after the expiration of said interval of time, and means for rendering said circuit means effective and simultaneously initiating an operation of said timers.

8. In a molding press in which the molding material in the dies is subjected to repeated compressions and release of pressure by the application of operating fluid to the ram which carries part of the dies and the release of fluid therefrom a number of times to work the entrapped air out of the material before final pressing, improved press operating apparatus which comprises said ram, electromagnetic means selectively operable to cause the admission of operating fluid to said ram or to release it therefrom, a pressure responsive switch actuated by the fluid pressure on said ram, a plurality of timing devices, circuit means including said timing devices and said switch for controlling said electromagnetic means and operable automatically to cause first a closing of the dies until a selected pressure is reached and then alternate opening and closing of said dies repeatedly a plurality of times for a selected interval of time, the openings being controlled by said switch and the closings by said timers, and then a closing with a sustained pressure on the dies for a selected time interval after the expiration of said interval of time, and means for rendering said circuit means effective and simultaneously initiating an operation of said timers.

9. In a molding press in which the molding material in the dies is subjected to repeated compressions and release of pressure by the application of operating fluid to the ram which carries part of the dies and the release of fluid therefrom a number of times to work the entrapped air out of the material before final pressing, improved press operating apparatus which comprises said ram, electromagnetic means selectively operable to cause the admission of operating fluid to said ram or to release it therefrom, a pressure responsive switch actuated by the fluid pressure on said ram, a plurality of timing devices, circuit means including said timing devices and said switch for controlling said electromagnetic means and operable automatically to cause first a closing of the dies until a selected pressure is reached and then alternate opening and closing of said dies repeatedly a plurality of times for a selected interval of time, the openings being controlled by said switch and the closings by said timers, then a closing with a sustained pressure on the dies for a selected time interval after the expiration of said interval of time, and then a final opening of said dies.

10. In a hydraulic press, a frame, a main cylinder, a ram in said cylinder and operable thereby, a source of fluid under pressure, a conduit for connecting said source to said main cylinder, a pilot operated control valve in said conduit, an exhaust pipe connected to said valve, said valve being operable to connect said cylinder alternately to said source and to exhaust, a solenoid, a hydraulic circuit for operating said control valve controlled by said solenoid, a yieldingly closed control switch responsive to pressure in said main cylinder, and opened by pressure and closed automatically when said pressure in said main cylinder fluctuates above and below a selected pressure, an electric circuit including said switch and said solenoid, and operable through said solenoid and hydraulic circuit to operate said pilot controlled valve and connect said source to said main cylinder when said pressure is below said selected pressure, and to connect said main cylinder to exhaust when said pressure is above said selected pressure, and mean for removing said electric circuit from the control of said pressure responsive switch and holding it closed beginning a predetermined time after a pressing stroke of said ram is begun.

11. In a hydraulic press, a frame, a main cylinder, a ram in said cylinder and operable thereby, a source of fluid under pressure, a conduit for connecting said source to said main cylinder, a pilot operated control valve in said conduit, an exhaust pipe connected to said valve, said valve being operable to connect said cylinder alternately to said source and to exhaust, a solenoid, a hydraulic circuit for operating said control valve controlled by said solenoid, a control switch responsive to pressure in said main cylinder, and opened when said main cylinder pressure rises above a selected pressure and closed automatically when said main cylinder pressure falls below said selected pressure, an electric circuit including said switch and said solenoid, and operable through said solenoid and hydraulic circuit to operate said pilot controlled valve and connect said source to said main cylinder when said switch is closed, and to connect said main cylinder to exhaust when said switch is open, and means for shunting said control switch a predetermined time after a pressing stroke of said ram is begun.

12. In a press in which the material in the dies is subjected to alternate compression and release of pressure by alternately delivering hydraulic operating fluid under pressure to a hydraulic ram operating said dies and releasing said pressure, the improved apparatus for actuating the ram for this purpose which comprises hydraulic valve means for admitting or releasing pressure to the ram, a power source for actuating the valve to one position, means for restoring the valve to its alternate position, an electromagnetic valve for controlling the actuation of the hydraulic valve from said power source, a pressure switch having open and closed positions, means for supplying press pressure to the pressure switch thereby to determine the position of said switch in response to the magnitude of said pressure, an electric circuit including the pressure switch and the electromagnetic valve for energizing said electromagnetic valve when the pressure switch is in one position, a timing control mechanism, said mechanism including a shunt circuit around said pressure switch, and means also included in said timing mechanism for supplying current through said shunt circuit upon initial supply of current to the timing mechanism, opening said circuit immediately thereafter for a predetermined period of time, thereupon again closing said circuit for a further period of time, and finally opening the circuit, whereby the application and release of pressure to the dies is initially responsive to pressure and is ultimately responsive to time.

13. In a press in which the material in the dies is subjected to alternate compression and release of pressure by alternately delivering hydraulic operating fluid under pressure to a hydraulic ram operating the dies and releasing said pressure, the improved apparatus for actuating said ram for this purpose which comprises hydraulic valve means adapted when in one position to admit pressure to the ram and when in another position to release pressure from the ram, thereby alternately applying or releasing pressure on said dies, power means for biasing said valve means to said one pressure admitting position, said valve being normally biased toward said another pressure releasing position, an electromagnetic valve for connecting said power means to said first named hydraulic valve means, an electric circuit for energizing said electromagnetic valve, a pressure switch adapted, when in one position, to close said electric circuit, a pressure line for transmitting the hydraulic pressure in the press to said pressure switch, said switch, when said pressure reaches a predetermined value, operating said switch to open the same and thereby deenergize the electromagnetic valve to effect a release of pressure on the dies, timing mechanism including electrical control means, an electric circuit taken through said control means and the electromagnetic valve for energizing said electromagnetic valve upon initial supply of current to said timing mechanism, thereby to effect an initial application of pressure to the dies, means included with said timing mechanism for establishing a shunt circuit around said pressure switch after a predetermined period of time, and means included in said timing mechanism for opening said initial energizing circuit after the lapse of a further period of time.

THOMAS F. STACY.